United States Patent [19]

Sakane et al.

[11] Patent Number: 5,725,257
[45] Date of Patent: Mar. 10, 1998

[54] PIPE JOINT

[75] Inventors: Hideto Sakane; Hisayuki Yagi, both of Saitama; Nobuyuki Okuda, Tochigi; Koichi Inoue, Ibaraki, all of Japan

[73] Assignees: Honda Giken Kogyo Kabushiki Kaisha, Tokyo; Showa Aluminum Corporation, Osaka, both of Japan

[21] Appl. No.: 645,562

[22] Filed: May 14, 1996

[30] Foreign Application Priority Data

May 17, 1995 [JP] Japan .................... 7-118702

[51] Int. Cl.$^6$ ............................. F16L 35/00
[52] U.S. Cl. ............ 285/81; 285/86; 285/319; 285/340; 285/921; 285/906
[58] Field of Search ............ 285/86, 319, 81, 285/340, 906, 921

[56] References Cited

U.S. PATENT DOCUMENTS

| 3,428,340 | 2/1969 | Pelton | 285/95 |
|---|---|---|---|
| 3,574,359 | 4/1971 | Klein | 285/86 |
| 3,922,011 | 11/1975 | Walters | 285/277 |
| 4,913,467 | 4/1990 | Washizu | 285/319 X |
| 5,028,080 | 7/1991 | Dennony | 285/319 X |
| 5,069,489 | 12/1991 | Bartholomew | 285/319 |
| 5,211,427 | 5/1993 | Washizu | 285/23 |
| 5,324,081 | 6/1994 | Umezawa | 285/86 |

FOREIGN PATENT DOCUMENTS

| 0 568 076 A1 | 11/1993 | European Pat. Off. | |
| 0 593 937 A1 | 4/1994 | European Pat. Off. | |
| 3508296 | 10/1986 | Germany | 285/319 |
| 5263975 | 10/1993 | Japan | 285/319 |
| 855603 | 12/1960 | United Kingdom | 285/86 |
| 2257217 | 1/1993 | United Kingdom | 285/319 |

*Primary Examiner*—Dave W. Arola
*Attorney, Agent, or Firm*—Armstrong, Westerman, Hattori, McLeland & Naughton

[57] ABSTRACT

A pipe joint comprises a pipe having a spigot formed with an annular projection on an outer periphery of an end portion of the pipe, a member having a socket including a tubular portion for receiving the spigot therein and formed with an aperture in a peripheral wall of the tubular portion, the socket being internally formed with a bearing portion for receiving and bearing on the annular projection when the spigot is inserted into the socket, a resilient stopper mountable on the tubular portion of the socket and having a fitting portion fittable in the aperture, and a tubular stopper holder capable of covering the stopper. The stopper holder is so fixed as to cover the stopper by a recess formed in an outer surface of the stopper and an inward protrusion formed on the stopper holder and fittable in the recess. The fitting portion of the stopper is fitted into the socket aperture in an inwardly projecting state when the stopper is mounted on the socket tubular portion, and the annular projection of the spigot is fixedly positioned between the bearing portion and the stopper fitting portion when the spigot is inserted into the socket.

12 Claims, 10 Drawing Sheets

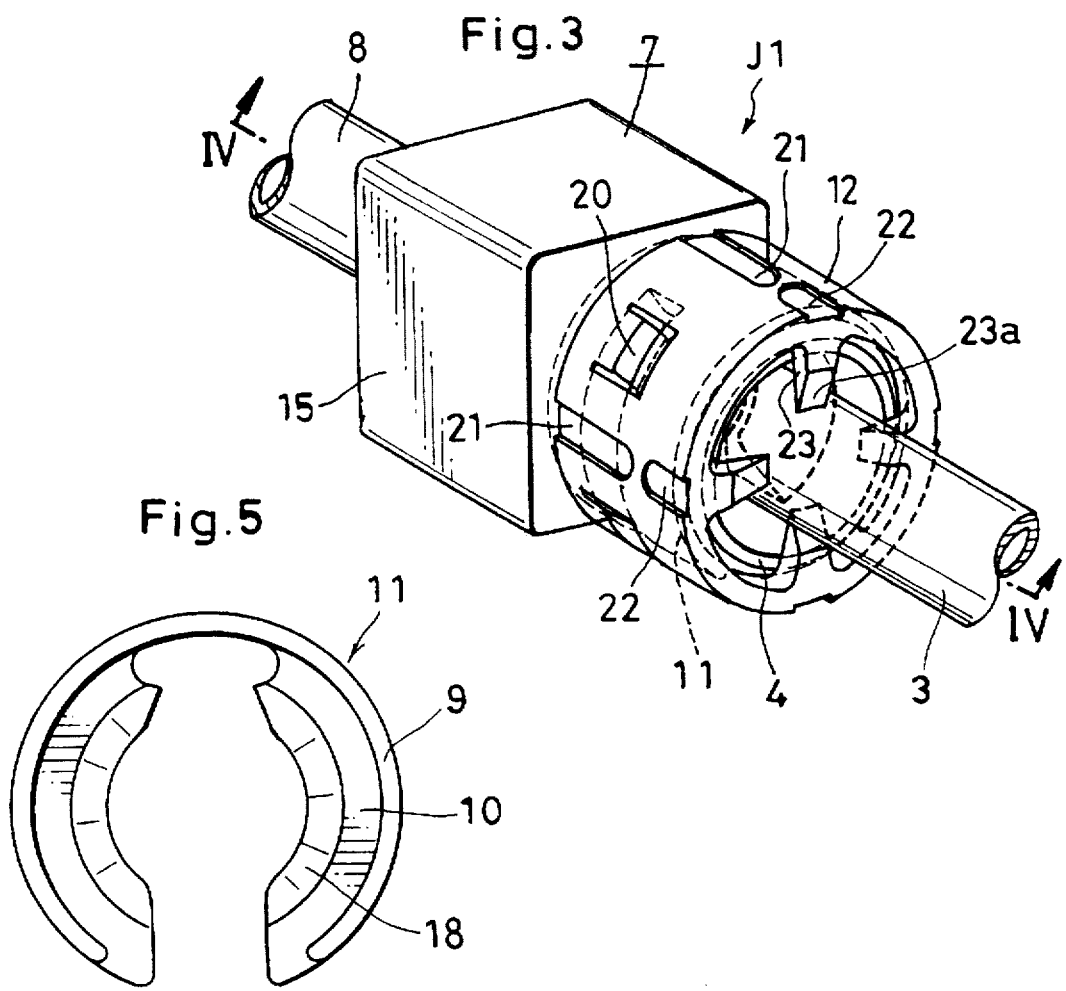
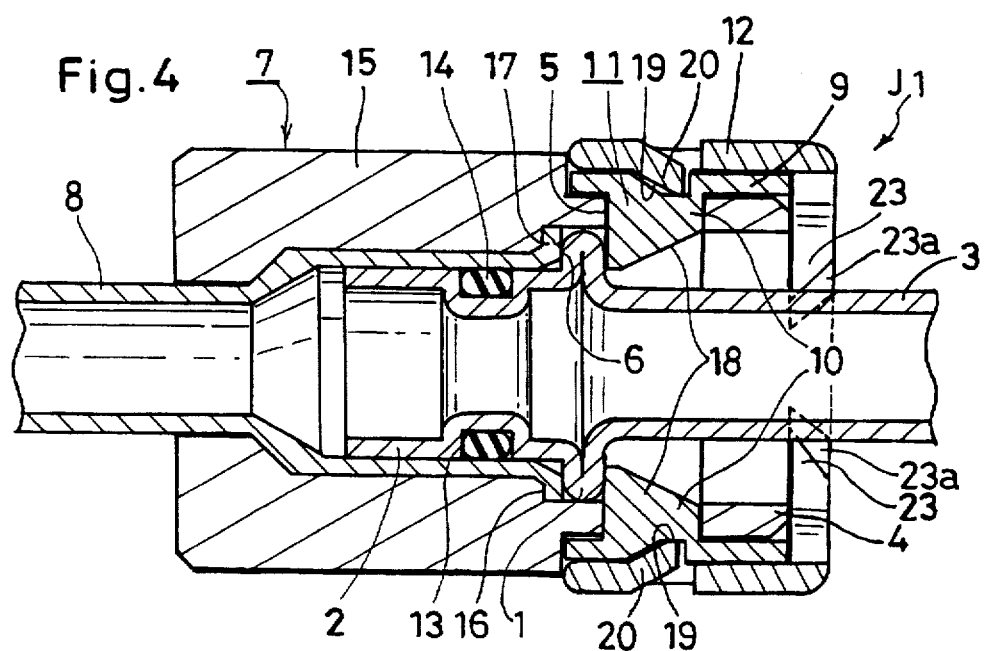

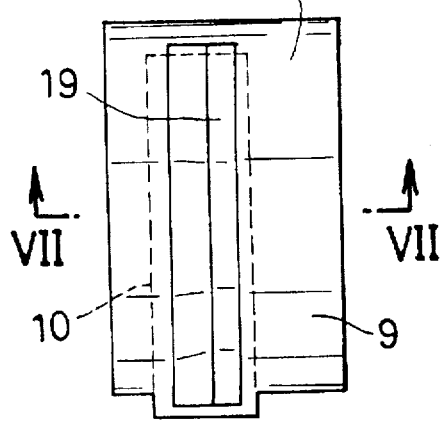
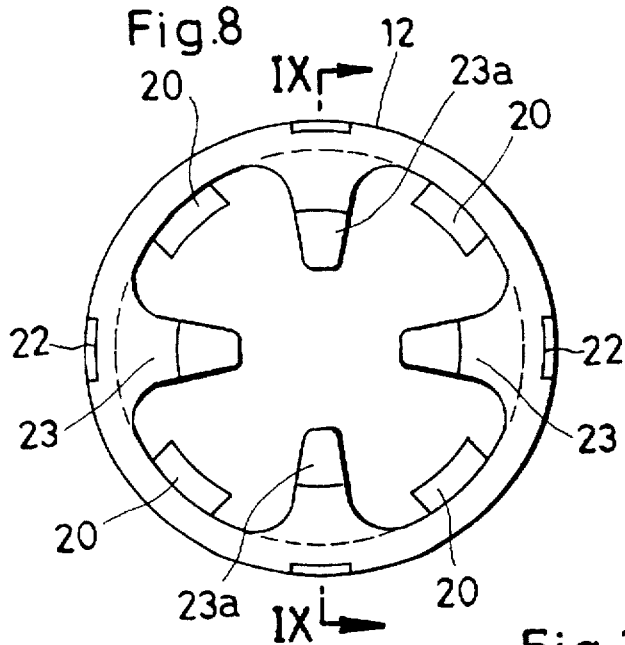
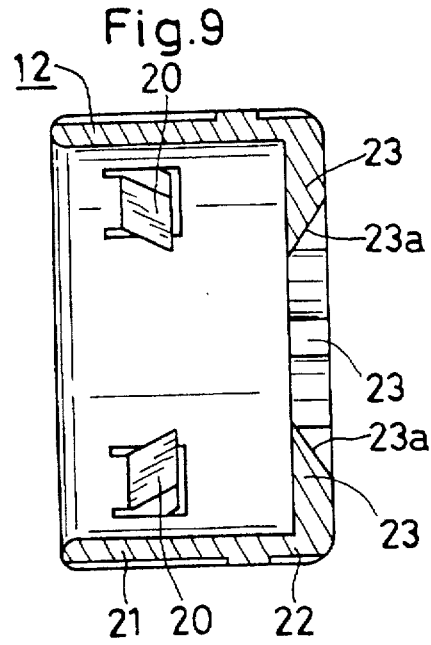
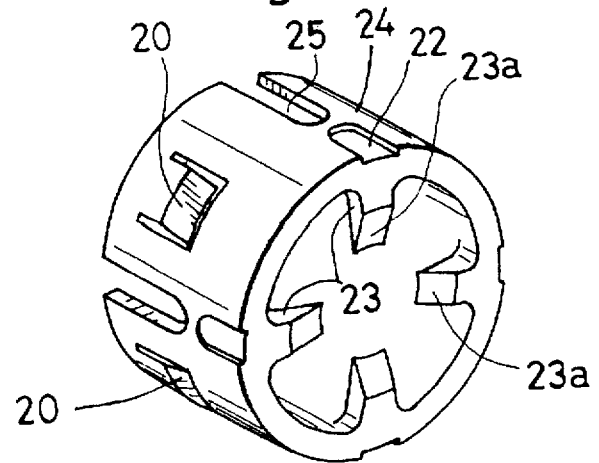

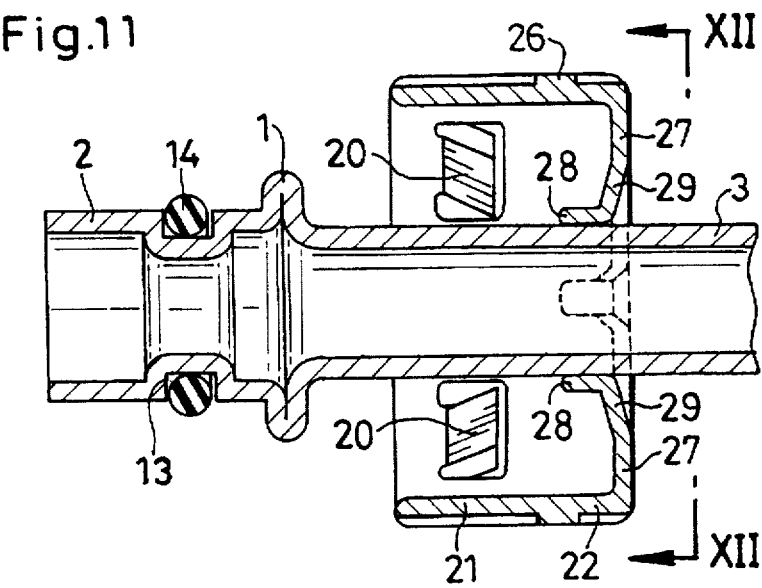
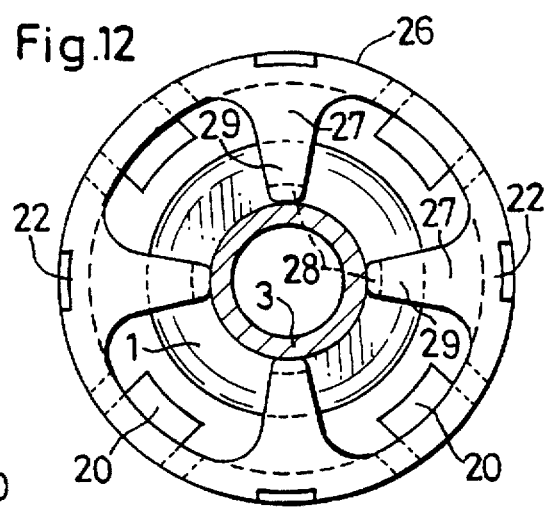
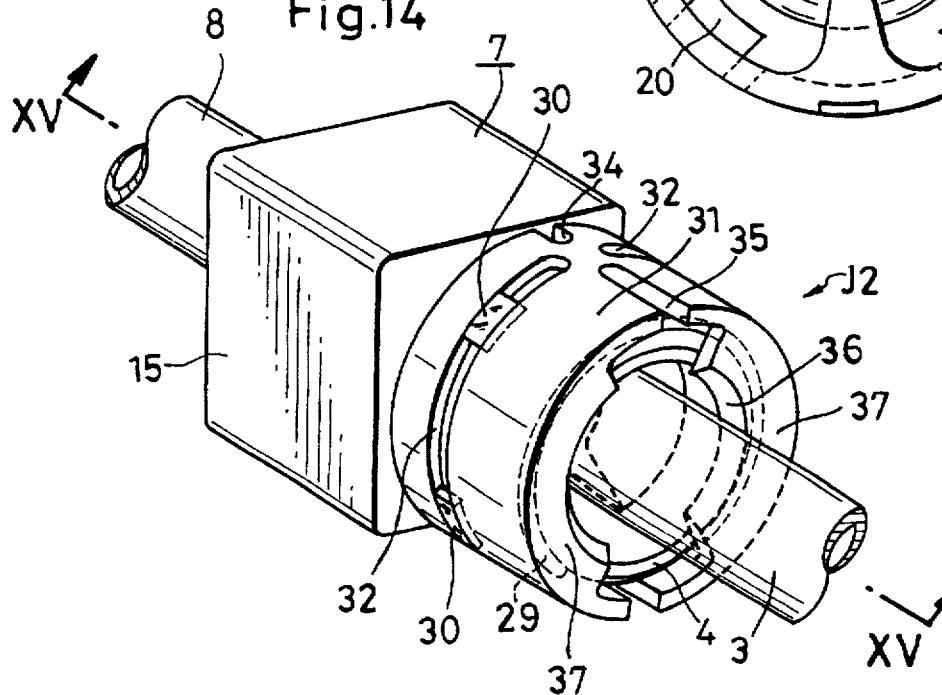

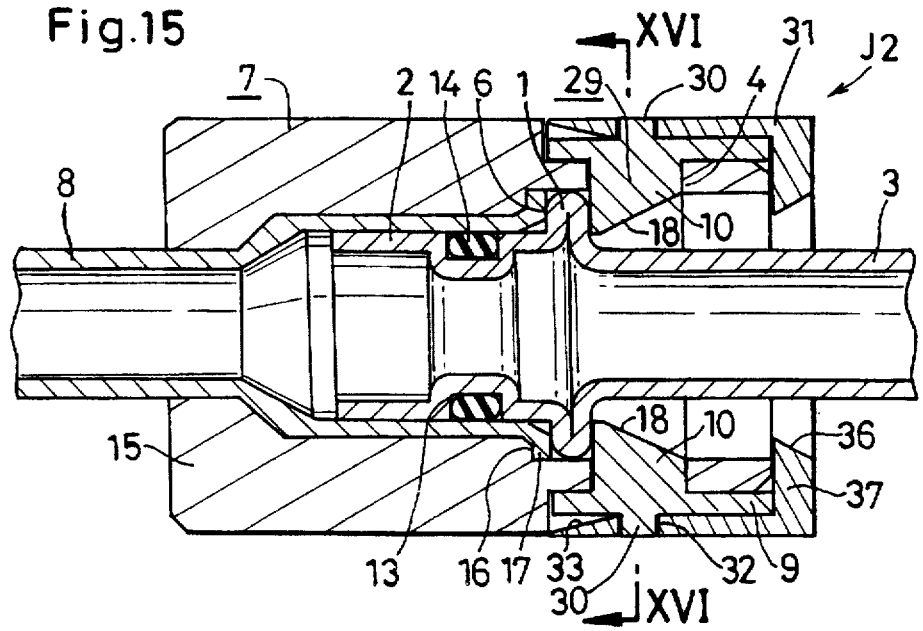
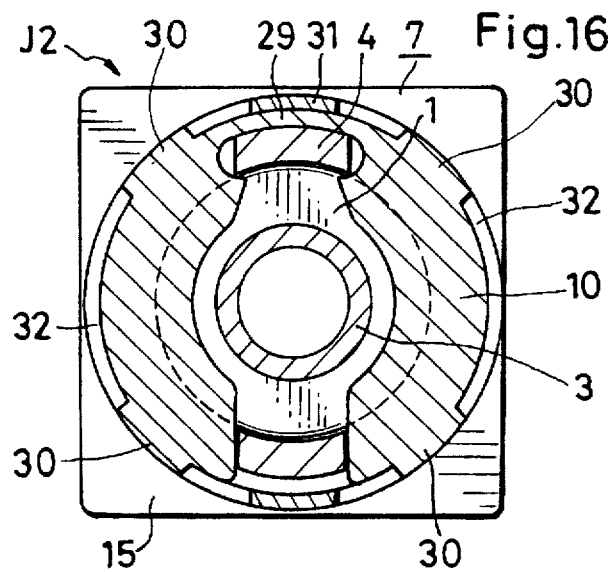
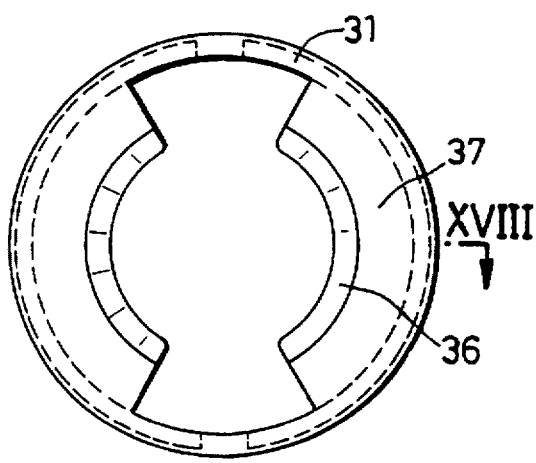
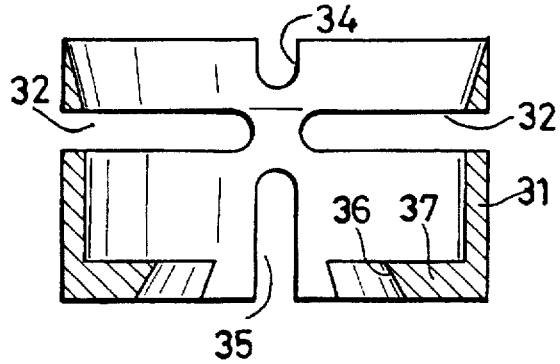

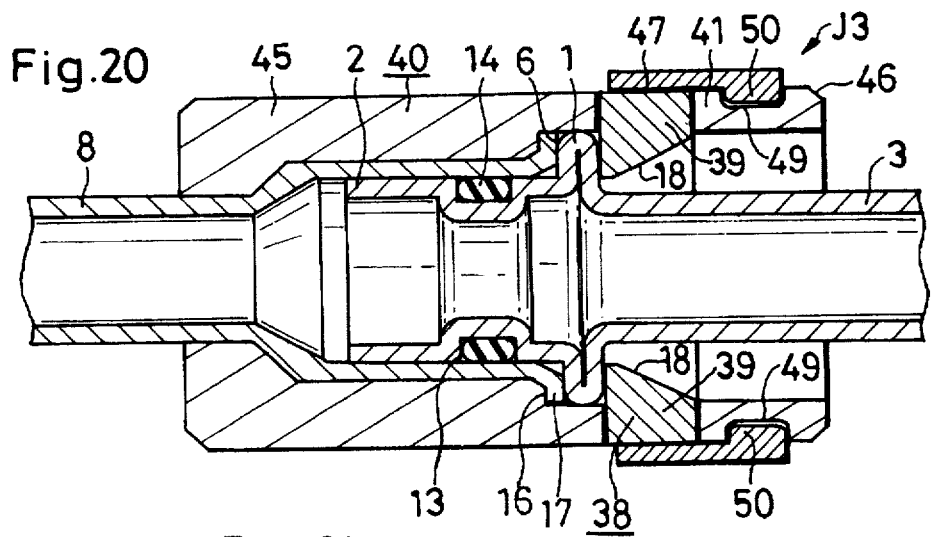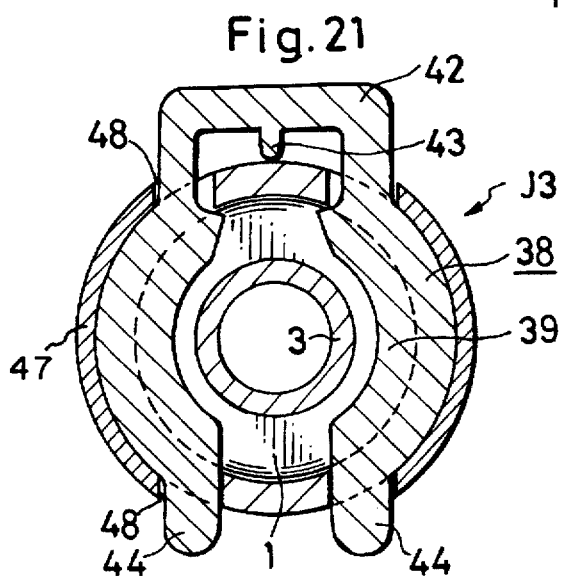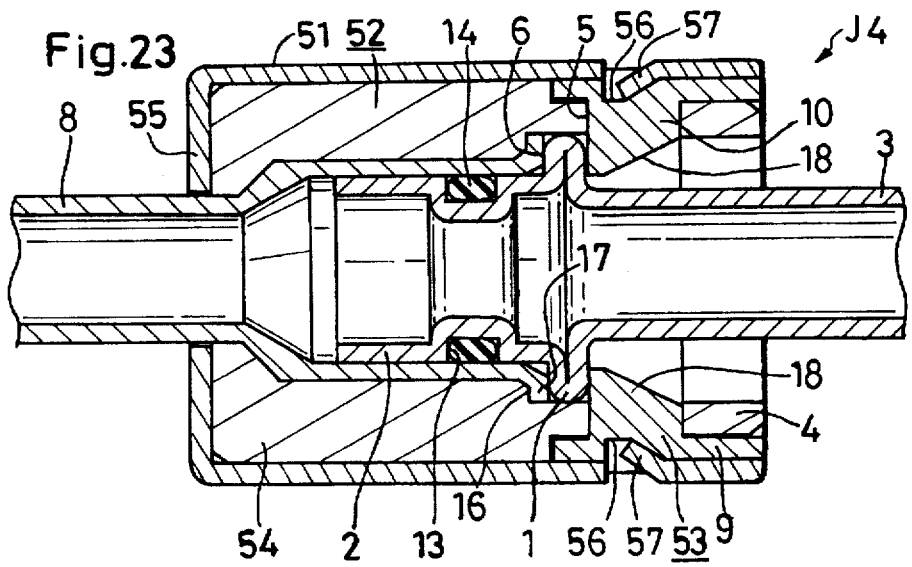

PIPE JOINT

BACKGROUND OF THE INVENTION

The present invention relates to pipe joints, and more particularly to pipe joints for use in piping for condensers, evaporators, receivers, etc. in motor vehicle air conditioners.

Throughout the specification and the claims, the term "front" refers to the direction in which a spigot of a pipe is inserted into a socket, and the term "rear" to a direction opposite to this direction; the terms "right" and "left" are used as the pipe joint is viewed toward the direction of insertion; and the term "inward" refers to the radially inward direction of the socket or stopper holder, and the term "outward" to a direction opposite to the inward direction.

As disclosed, for example, in U.S. Pat. No. 5,211,427, conventional pipe joints of the type mentioned generally comprise a pipe having a spigot formed with an annular projection on the outer periphery of an end portion of the pipe, a member having a socket including a tubular portion for receiving the spigot therein and formed with apertures in the peripheral wall of the tubular portion, and a resilient stopper mountable on the tubular portion of the socket and having fitting portions fittable in the respective apertures. When the stopper is mounted on the tubular portion of the socket, the fitting portions of the stopper are fitted into the respective apertures of the socket in an inwardly projecting state. When the spigot is inserted into the socket, the spigot, even if acting to move in a direction opposite to the direction of insertion, is prevented from moving by the contact of the annular projection of the spigot with the fitting portions of the stopper. However, the stopper is intentionally removable from the socket by manually withdrawing the fitting portions from the apertures of the tubular portion. Intentional removal of the stopper from the socket leads, for example, to a gas leak, posing a hazard.

An object of the present invention is to provide a pipe joint wherein a pipe, once connected to a socket, is not removable only by hand and which is made free from the above hazard.

SUMMARY OF THE INVENTION

The present invention provides a pipe joint fulfilling the above object. The pipe joint comprises a pipe having a spigot formed with an annular projection on an outer periphery of an end portion of the pipe, a member having a socket including a tubular portion for receiving the spigot therein and formed with an aperture in a peripheral wall of the tubular portion, the socket being internally formed with a bearing portion for receiving and bearing on the annular projection when the spigot is inserted into the socket, a resilient stopper mountable on the tubular portion of the socket and having a fitting portion fittable in the aperture, a resilient tubular stopper holder capable of covering at least a major portion of the entire stopper, and fixing means for fixing the stopper holder with the stopper covered with the stopper holder, the fitting portion of the stopper being fitted into the aperture of the socket in an inwardly projecting state when the stopper is mounted on the tubular portion of the socket, the annular projection of the spigot being fixedly positioned between the bearing portion and the fitting portion of the stopper when the spigot is inserted into the socket. Once connected to the socket, the pipe is therefore unremovable by hand only.

The fixing means comprises a recess formed in an outer surface of the stopper and an inward protrusion formed on the stopper holder and fittable in the recess; an outward protrusion formed on the outer surface of the stopper and one of an opening and a recess formed in the stopper holder for fittingly receiving the outward protrusion therein; a recess formed in an outer surface of the tubular portion of the socket and an inward protrusion fittable in the recess and formed on an inner surface of a portion of the stopper holder for covering the socket tubular portion; or an outward protrusion formed on the outer surface of the tubular portion of the socket and one of an opening and a recess formed in the portion of the stopper holder for covering the socket tubular portion, the outward protrusion being fittable in the opening or the recess.

At least thin wall portions or cutouts axially extending from at least one of a front edge and a rear edge of the stopper holder to an intermediate portion thereof between the two edges are approximately equidistantly spaced apart circumferentially of the stopper holder. The thin wall portions or the cutouts are positioned away from the inward protrusion when the stopper holder has the inward protrusion, or positioned away from the opening or the recess when the stopper holder has the opening or the recess. Because of this construction and further because the stopper holder is resilient, the stopper holder deforms while being fitted around the stopper, restores itself upon the protrusion of one of these members fitting into the corresponding recess or opening of the other member, and is fixed in position with the stopper covered with the stopper holder.

The stopper holder is formed, as spaced apart approximately equidistantly, with a plurality of lugs extending from a rear end of the stopper holder inward beyond an outer periphery of the annular projection of the spigot when the spigot is inserted into the socket with the stopper holder so fixed as to cover the stopper, so that even if the pipe is directed downward before being connected to the socket, the lugs are caught by the annular projection of the pipe, preventing the stopper holder from slipping off from the pipe. Accordingly, when the pipe is to be connected to the socket as directed upward, the stopper holder need not be manually held in position on the pipe.

The lugs have holding portions extending in a bent form from respective inward ends thereof axially of the pipe so as to grip an outer periphery of the pipe. This eliminates the likelihood that the stopper holder will move to a position a large distance away from the spigot, for example, during the transport of the pipe.

The material for the resilient stopper is preferably a fiberglass reinforced synthetic resin. Examples of suitable synthetic resins are nylon 66 and nylon 610.

The material for the resilient stopper-holder is preferably a synthetic resin. Nylon 66 and nylon 610 are especially suitable as such synthetic resins.

Aluminum or an aluminum alloy is usually used for the pipe and the socket.

The present invention will be described in greater detail with reference to the accompanying drawings.

BRIEF DESCRIPTION OF THE DRAWINGS

FIG. 3 is a perspective view of the pipe joint of FIG. 1 after connection;

FIG. 4 is an enlarged view in section taken along the line IV—IV in FIG. 3;

FIG. 5 is a rear view of the stopper of FIG. 1;

FIG. 6 is a side elevation of the stopper of FIG. 5;

FIG. 8 is a rear view of a stopper holder of FIG. 1;

FIG. 9 is a view in section taken along the line IX—IX in FIG. 8;

FIG. 10 is a perspective view showing a modification of the stopper holder of FIG. 1;

FIG. 11 is a view in vertical section showing another modification of the stopper holder of FIG. 1;

FIG. 12 is a view in section taken along the line XII—XII in FIG. 11;

FIG. 14 is a perspective view showing the pipe joint of FIG. 13 after connection;

FIG. 15 is an enlarged view in section taken along the line XV—XV in FIG. 14;

FIG. 16 is an enlarged view in section taken along the line XVI—XXI in FIG. 15;

FIG. 17 is a rear view of a stopper holder of FIG. 13;

FIG. 18 is a view in section taken along the line XVIII—XVIII in FIG. 17;

FIG. 20 is a view in horizontal section showing the pipe joint of FIG. 19 after connection;

FIG. 21 is a cross sectional view showing the pipe joint of FIG. 19 after connection;

FIG. 23 is a view in horizontal section showing the pipe joint of FIG. 22 after connection.

DESCRIPTION OF THE PREFERRED EMBODIMENTS

First Embodiment

Figure 1:
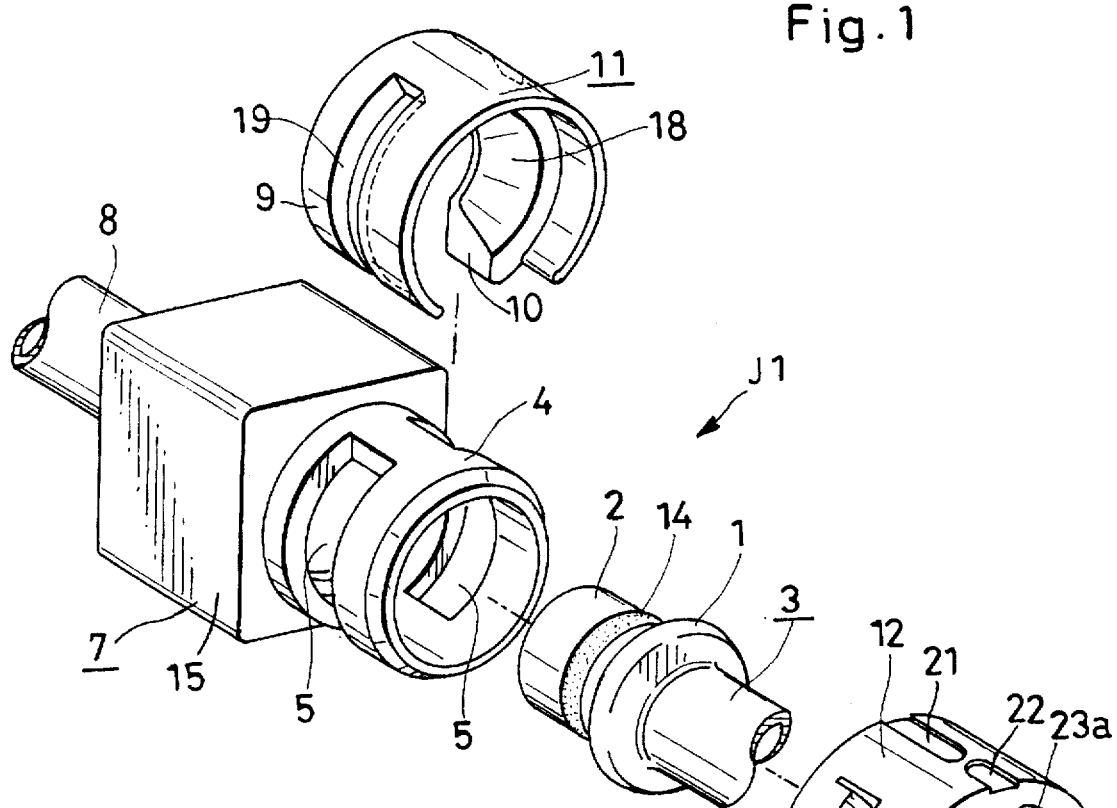
FIG. 1 is a perspective view showing a first embodiment of the invention, i.e., a pipe joint, before connection.

The first embodiment is shown in FIGS. 1 to 9. A pipe joint J1 comprises a connection pipe 3 having a spigot 2 formed with an annular projection 1 on the outer periphery of an end portion of the pipe 3; a pipe 8 to be connected to the pipe 3 and having a socket 7 including a tubular portion 4 of circular cross section for receiving the spigot 2 therein, the socket 7 being formed, in the peripheral wall of the tubular portion 4, with two apertures 5 circumferentially extending at the respective right and left sides of the wall symmetrically, the socket 7 being internally formed with a bearing portion 6 for receiving and bearing on the annular projection 1 when the spigot 2 is inserted into the socket 7; a resilient stopper 11 having an embracing portion 9 C-shaped in cross section and having a greater axial width than the apertures 5 of the socket 7, and circular-arc fitting portions 10 provided inside the embracing portion 9 toward its front edge in an inwardly projecting form and positioned symmetrically in corresponding relation with the two apertures 5, respectively; and a tubular stopper holder 12 of circular cross section capable of covering the entire stopper 11.

An annular groove 13 is formed in the spigot 2 at a portion to the front of the annular projection 1 and has an O-ring 14 fitted therein. The socket 7 has in front of the tubular portion 4 a rectangular parallelepipedal portion 15 greater than the portion 4 in contour and internally formed with an annular stepped part 16. The parallelepipedal portion 15 has inserted therein the pipe 8, which has a flange 17 formed at a rear-end large-diameter portion and held in intimate contact with the stepped part 16 to provide the bearing portion 6. The large-diameter portion of the pipe 8 has an inside diameter equal to the outside diameter of the portion of the connection pipe 3 to the front of the annular projection 1. The latter portion is adapted to be inserted into the large-diameter portion of the pipe 8. The inside diameter of the tubular portion 4 is approximately equal to the outside diameter of the annular projection 1.

The lower ends of the circular-arc fitting portions 10 of the stopper 11 extend downward slightly beyond the respective lower ends of the embracing portion 9. The width of the fitting portions 10 is approximately equal to that of the apertures 5, and a slope 18 facing rearwardly inward is formed on each fitting portion 10 in its entirety. The stopper 11 is formed in its outer surface with two groovelike recesses 19 extending circumferentially thereof symmetrically at right and left and positioned in corresponding relation with the circular-arc fitting portions 10. Four inward protrusions 20 are formed on the inner surface of the stopper holder 12 symmetrically at right and left, and are fittable in the groovelike recesses 19, two protrusions 20 in each recess 19. The front wall defining each groovelike recess 19 is inclined forwardly outward to provide a slope, while the rear wall defining the recess is vertical.

The inward protrusion 20 is naillike and formed by lancing the peripheral wall of the stopper holder 12 in the form of a louver obliquely facing forwardly inward. The inclination of the protrusion lower surface facing forwardly inward is equal to that of the front slope of the recessed portion 19. The inward protrusion 20 has a vertical rear face.

The inside diameter of the stopper holder 12 is approximately equal to the outside diameter of the embracing portion 9 of the stopper 11. The stopper holder 12 has four pairs of front and rear thin wall portions 21, 22 positioned away from the inward protrusions 20 and equidistantly spaced apart circumferentially of the holder, each pair of front and rear thin wall portions 21, 22 axially extending from opposite edges of the holder 12 to an intermediate portion between the two edges. The front thin wall portions 21 are longer than the rear thin wall portions 22 and arranged alternately with the inward protrusions 20.

The stopper holder 12 is formed, as spaced apart equidistantly, with four lugs 23 extending from the rear end of the stopper holder 12 inward beyond the outer periphery of the annular projection 1 of the spigot 2 when the spigot 2 is inserted into the socket 7 with the stopper holder 12 so fixed as to cover the stopper 11. The inward end of each lug 23 is formed with a slope 23a facing rearwardly inward so that when the stopper holder 12 is assembled with the connection pipe 3, the lug 23 bends and easily moves past the annular projection 1. The tubular portion 4 of the socket 7 has a width equal to that of the embracing portion 9 of the stopper 11. The width of the stopper holder 12 is greater than the width of these portions, 4, 9 by an amount corresponding to the thickness of the lugs 23.

The pipe joint J1 is used in the following manner. The stopper holder 12 is mounted on the connection pipe 3 in advance, and positioned to the rear of the spigot 2 as shown in FIGS. 1 and 2.

Figure 2:
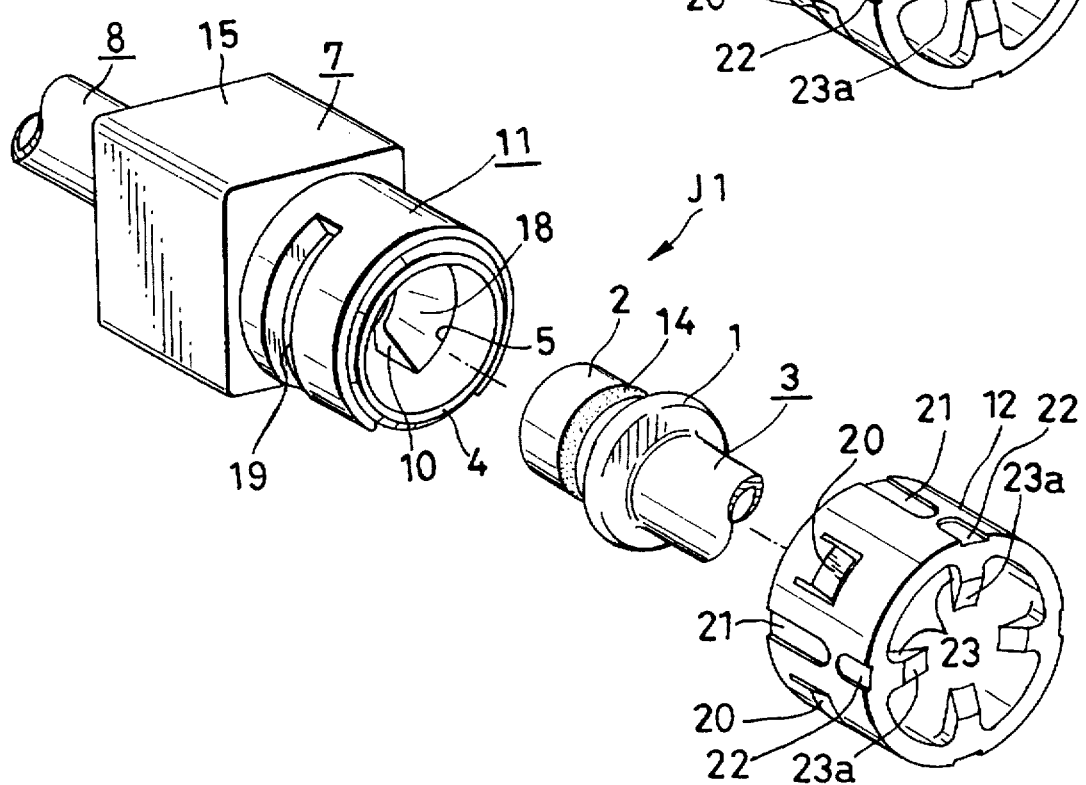
FIG. 2 is a perspective view of the pipe joint of FIG. 1 showing a stopper as mounted on a tubular portion of a socket.
Figure 7:
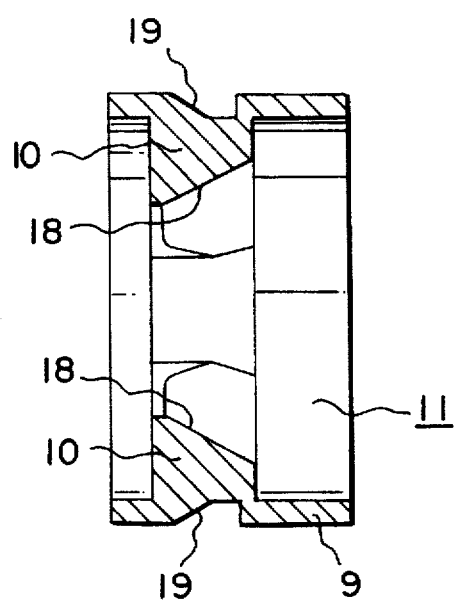
FIG. 7 is a view in section taken along the line VII—VII in FIG. 6.
Figure 13:
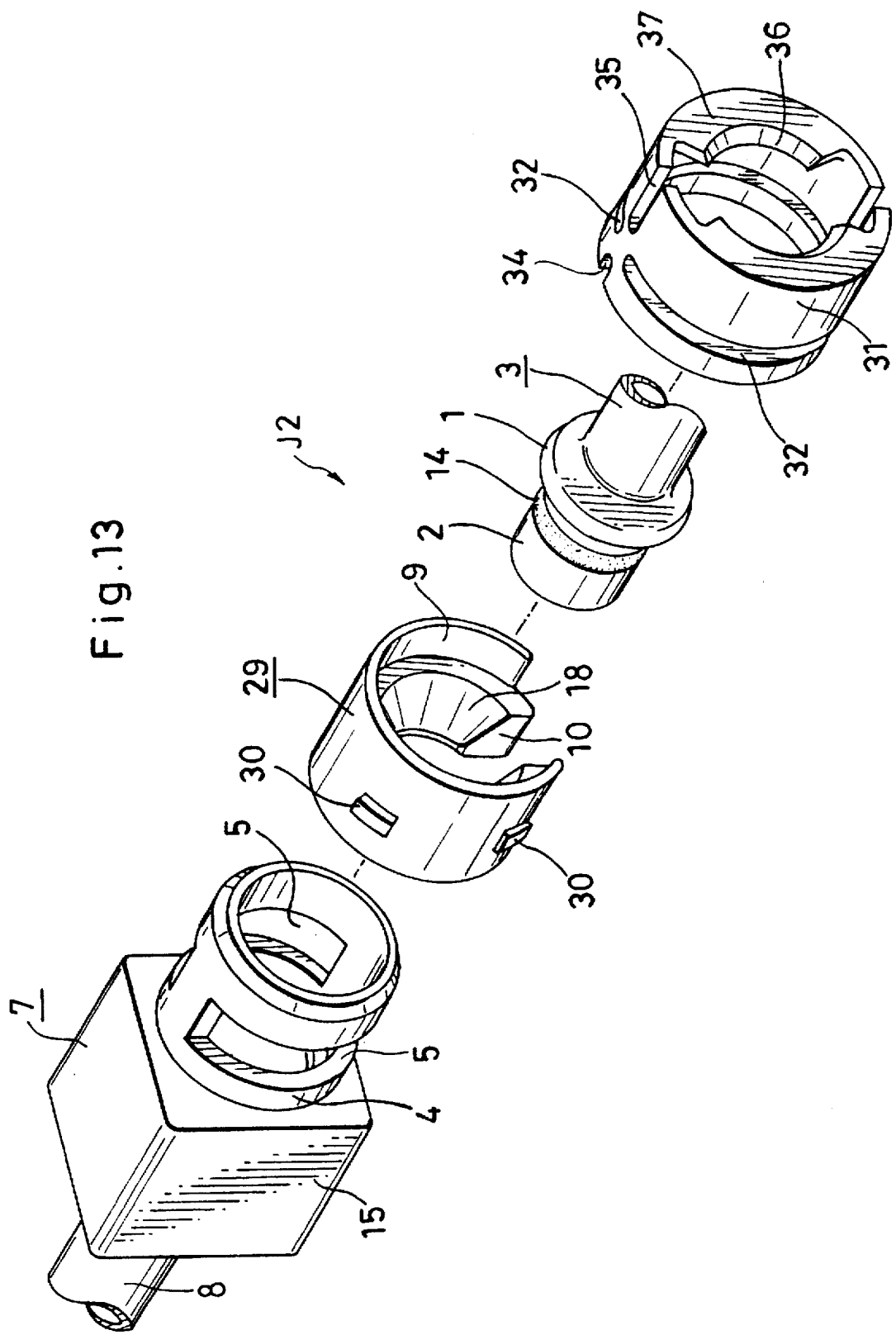
FIG. 13 is a perspective view showing a second embodiment of the invention, i.e., a pipe joint, before connection.

As seen in FIG. 2, the stopper 11 is first fitted around the tubular portion 4 of the socket 7 from above. At this time, the embracing portion 9 of the stopper 11 expands along the outer periphery of the tubular portion 4, and the circular-arc fitting portions 10 are fitted into the respective apertures 5 in a radially inwardly projecting state.

Next, the spigot 2 of the connection pipe 3 is inserted into the socket 7. At this time, the annular projection 1 of the spigot 2 comes into contact with the rearwardly inwardly facing slopes 18 of the stopper 11. The projection 1 advances in contact with the slopes 18, whereby the two circular-arc fitting portions 10 are gradually movd away from each other against the resiliency of the stopper 11, with the result that the annular projection 1 moves past the fitting portions 10 and bears against the bearing portion 6. At this time, the fitting portions 10 return to the original state owing to the resilience of the stopper 11, and the annular projection 1 is fixedly positioned between the bearing portion 6 and the circular-arc fitting portions 10.

In this way, the connection pipe 3 is completely joined to the socket 7, therefore to the pipe 8.

Finally as shown in FIGS. 3 and 4, the stopper holder 12 is fitted over the tubular portion 4 of the socket 7 from behind so as to cover the entire stopper 11. At this time, the inward protrusions 20 are slidable on the outer surface of the embracing portion 9 of the stopper 11 free of trouble because the stopper holder 12 is resilient, has the thin wall portions 21, 22 and is therefore deformable outward. When the holder 12 is completely fitted over the socket tubular portion 4 with the stopper 11 provided therebetween, the inward protrusions 20 fit into the recesses 19 of the stopper 11, whereupon the stopper holder 12 restores itself by virtue of its resilience. Consequently, the inward protrusions 20 are not releasable from the recesses 19, rendering the holder 12 immovable. Accordingly, the stopper 11 is unremovable from the socket 7 manually.

While modifications and further embodiments will be described below, like parts are designated by like reference numerals throughout the specification, and the parts already described will not be described repeatedly.

FIG. 10 shows a modified stopper holder. With this stopper holder 24, the portions corresponding to the front thin wall portions 21 of the stopper holder 12 of the first embodiment are in the form of cutouts 25, whereby the holder 24 is made deformable outward with greater ease.

FIGS. 11 and 12 show another modified stopper holder. This stopper holder 26 is provided with four lugs 27 which have holding portions 28 extending in a forwardly bent form from the respective inner ends thereof axially of the connection pipe 3 so as to grip the outer periphery of the pipe 3. The lugs 27 each have a slanting portion 29 formed at the part thereof outward from the holding portion 28 and facing rearwardly inward. The holding portions 28 hold the holder 26 in position on the pipe 3

Second Embodiment

The second embodiment is shown in FIGS. 13 to 18. With this pipe joint J2, a stopper 29 has four outward protrusions 30 formed on the outer surface thereof symmetrically at right and left, and a stopper holder 31 is formed in its peripheral wall with two openings 32 extending circumferentially and arranged symmetrically at right and left for receiving two outward protrusions 30 in each opening 32. The stopper holder 31 is formed on an inner side of a front edge portion thereof with a slope 33 facing forwardly inward.

The stopper holder 31 is provided with two pairs of front and rear cutouts 34, 35 positioned away from the openings 32 and spaced apart circumferentially of the holder. The front and rear cutouts 34, 35 in each pair axially extend from opposite edges of the holder 31 to an intermediate portion between the two edges. The front cutout 34 is shorter than the rear cutout 35, and the intermediate portion between the two cutouts 34, 35 coincides with the intermediate portion between the two openings 32. The stopper holder 31 has circular-arc lugs 37 extending inward from the rear end thereof and each formed at its inward end with a slope 36 facing rearwardly inward. The lugs 37 are two in number and arranged at right and left symmetrically. The embodiment has the same construction as the first embodiment except for the above described features.

Third Embodiment

Figure 19:
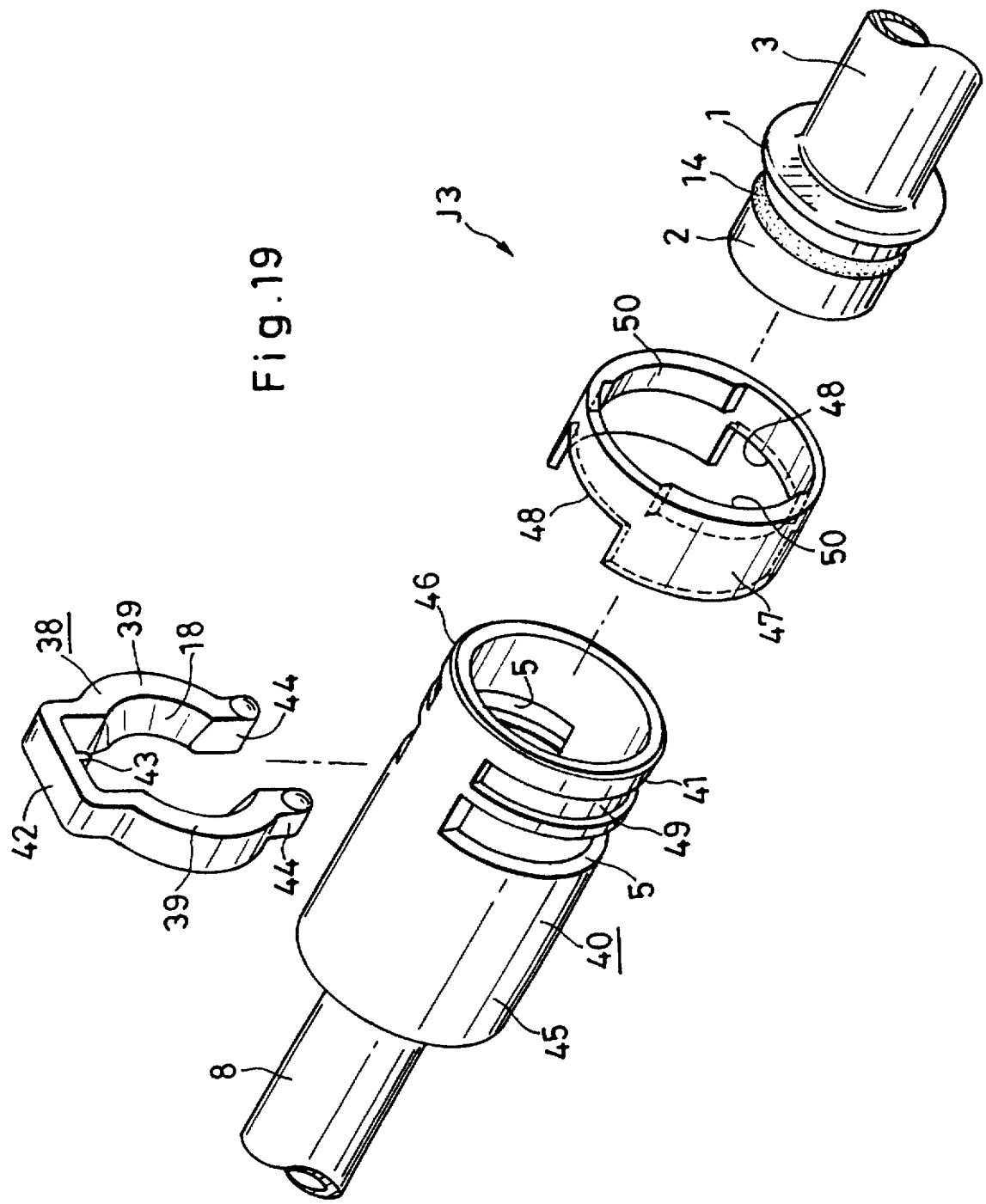
FIG. 19 is a perspective view showing a third embodiment of the invention, i.e., a pipe joint, before connection.

The third embodiment is shown in FIGS. 19 and 20. A pipe joint J3 includes a stopper 38 having no embracing portion and two circular-arc fitting portions 39, which are so formed that the outer surfaces thereof are flush with the outer surface of a rear tubular portion 41. The fitting portions 39 are integral with respective lower ends of an inverted U-shaped head 42 which is positioned outside the rear tubular portion 41 when the fitting portions 39 are fitted into the respective apertures 5. The head 42 has at its midportion a downwardly projecting portion 43 which comes into contact with the outer surface of the rear tubular portion 41 for positioning the stopper 38 in place. The fitting portions 39 are each provided at the lower end thereof with a leg 44 extending downward from the aperture 5. A front tubular portion 45 having the same outside diameter as the rear tubular portion 41 is formed in front of the portion 41. The rear tubular portion 41 has a slanting rear edge face 46. A stopper holder 47 is in the form of a hollow cylinder having a width enabling the holder 47 to cover a major portion of the stopper 38 as mounted on the rear tubular portion 41 of the socket 41 and a major portion of the part of the rear tubular portion 41 to the rear of the stopper 38. The stopper holder 47 is formed in its front edge with cutouts 48 for clearing the head 42 and the legs 44 when to be installed on the rear tubular portion 41. Means for fixing the stopper holder 47 has two recesses 49 formed in the outer surface of the rear tubular portion 41 of the socket 40 symmetrically at right and left, and two opposed inward protrusions 50 formed symmetrically on the inner surface of the portion of the holder 47 for covering the rear tubular portion 41 and fittable in the respective recesses 49. The means for fixing the stopper holder 47 may comprise an outward protrusion formed on the outer surface of the rear tubular portion 41, and an opening or recess formed in the portion of the holder 47 for covering the rear tubular portion 41, in place of the above-mentioned recess 49 and protrusion 50. Alternatively, the stopper 38 and the stopper holder 47 may be provided with such fixing means.

Fourth Embodiment

Figure 22:
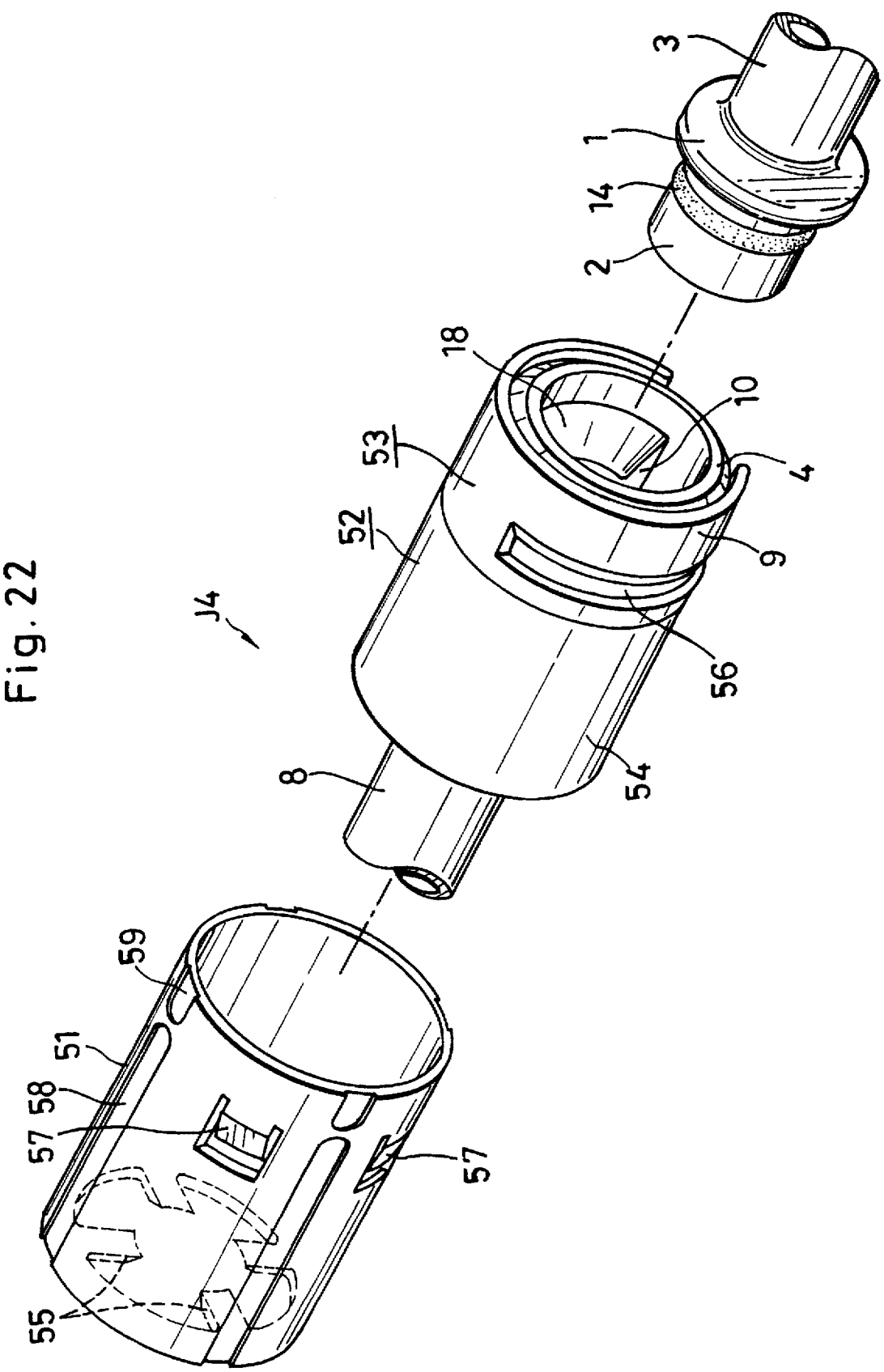
FIG. 22 is a perspective view showing a fourth embodiment of the invention, i.e., a pipe joint, before connection, with a stopper mounted on a rear tubular portion.

The fourth embodiment is shown in FIGS. 22 and 23. A pipe joint J4 comprises the pipe joint J1 of the first embodiment which is so modified that a stopper holder 51 is fittable over a socket 52 from the front and is adapted to cover a stopper 53 in its entirety. For this purpose, the socket 52 has in front of the rear tubular portion 4 a front tubular portion 54 with a wall thickness radially greater than that of the portion 4 by an amount corresponding to the thickness of embracing portion 9 of the stopper 53. The stopper holder 51 has no lug at the rear end thereof but is formed at its front end with four lugs 55 extending toward the pipe 8. With the first embodiment, the groovelike recess 19 of the stopper 11 is defined by a forwardly inwardly inclined front wall and a vertical rear wall, and the inward protrusion 20 of the stopper holder 51 has an inclined lower surface facing forward. According to the embodiment 4, however, the stopper 53 has a groovelike recess 56 defined by a rearwardly outwardly inclined rear wall and a vertical front wall, and the stopper holder 51 has an inward protrusion 57 with an inclined lower surface facing rearwardly outward. To render such inward protrusions 57 slidable on the outer surface of the front tubular portion 54 of the socket 52, the stopper holder 51 has four pairs of front and rear thin wall portions 58, 59 positioned away from the inward protrusions 57 and equidistantly spaced apart circumferentially of the holder. The front and rear thin wall portions 58, 59 in each pair axially extend from opposite edges of the holder 51 to an intermediate portion between the two edges. The front thin wall portions 58 are longer than the rear thin wall portions 59 and arranged alternately with the inward protrusions 57.

The pipe 8 to be connected to the connection pipe 3 has one end which is joined to the socket to serve as such according to the foregoing embodiments, whereas for example in the case of receivers, the socket is provided at the head portion of the receiver.

What is claimed is:

1. A pipe joint comprising a pipe having a spigot formed with an annular projection on an outer periphery of an end of said pipe, a member having a socket including a tubular portion for receiving said spigot therein and formed with an aperture in a peripheral wall of said tubular portion, said socket being internally formed with a bearing portion for receiving and bearing on said annular projection of said pipe adjacent said spigot in said socket, a resilient stopper mountable on said tubular portion of said socket and having a fitting portion fitted in said aperture, a resilient tubular stopper holder covering at least a major portion of an entirety of said stopper, and fixing means for fixing said stopper holder with said stopper covered with said stopper holder, said fitting portion of said stopper being fitted into said aperture of said socket so as to project inwardly and said stopper being mounted on said tabular portion of said socket, said annular projection of said spigot being fixedly positioned between said bearing portion and said fitting portion of said stopper, and wherein said stopper holder is formed with at least one lug extending from a rear end of said stopper holder in an inward direction so as to be beyond an outer periphery of said annular projection of said spigot.

2. The pipe joint as defined in claim 1, wherein said fixing means comprises a recess formed in an outer surface of said stopper and an inward protrusion means, formed on said stopper holder, for fitting in said recess.

3. The pipe joint as defined in claim 1, wherein said fixing means comprises an outward protrusion formed on an outer surface of said stopper and means, formed in said stopper holder, for receiving said outward protrusion therein.

4. The pipe joint as defined in claim 1, wherein said fixing means comprises a recess formed in an outer surface of said tubular portion of said socket and an inward protrusion means for fitting in said recess and formed on an inner surface of a portion of said stopper holder for covering said tubular portion of said socket.

5. The pipe joint as defined in claim 1, wherein said fixing means comprises an outward protrusion formed on an outer surface of said tubular portion of said socket and one of an opening and a recess formed in a portion of said stopper holder which stopper holder covers said tubular portion of said socket, said outward protrusion being fittable in any one of said opening and said recess.

6. The pipe joint as defined in any one of claim 2 and claim 4, wherein said inward protrusion of said stopper holder has a lanced peripheral wall which forms a louver facing inwardly and facing forwardly at an oblique angle.

7. The pipe joint as defined in any one of claims 2 and 4, wherein any one of at least thin wall portions and cutouts axially extending from at least one of a front edge and a rear edge of said stopper holder to an intermediate portion thereof between said two edges are positioned away from said inward protrusion and approximately equidistantly spaced apart circumferentially of said stopper holder.

8. The pipe joint as defined in any one of claims 3 and 5, wherein any one of at least thin wall portions and cutouts axially extending from at least one of a front edge and a rear edge of said stopper holder to an intermediate portion thereof between said two edges are positioned away from any one of said opening and said recess and approximately equidistantly spaced apart circumferentially of said stopper holder.

9. The pipe joint as defined in claim 1, wherein said lugs have holding portions extending in a bent form from respective inward ends thereof axially of said pipe so as to grip an outer periphery of said stopper.

10. The pipe joint as defined in claim 1, wherein said stopper holder is formed, as spaced apart approximately equidistantly, with four lugs extending from a rear end of said stopper holder inward beyond an outer periphery of said annular projection of said spigot when said spigot is inserted into said socket with said stopper holder so fixed as to cover said stopper, and said lugs have holding portions extending in a forwardly bent form from respective inward ends thereof axially of said pipe so as to grip an outer periphery of said pipe, each of said lugs having a slanting portion facing towards an inward rear hereof and formed at a part thereof outwardly from said holding portion.

11. The pipe joint as defined in claim 1, wherein said stopper has an embracing portion of an axial width greater than that of said socket aperture, said fitting portion being in an inwardly projecting form, said embracing portion of said stopper being expandable along an outer periphery of said tubular portion of said socket when said stopper is mounted on said socket tubular portion, said fixing means comprising two groovelike recesses formed in an outer surface of said stopper symmetrically at right and left sides thereof and extending circumferentially of said stopper, and four inward protrusions formed in an inner surface of said stopper holder symmetrically at right and left sides thereof and fittable in said recesses, two in each recess.

12. The pipe joint as defined in claim 1, wherein said stopper has an embracing portion of an axial width greater than that of said socket aperture, said fitting portion being in an inwardly projecting form, said embracing portion of said stopper being expandable along an outer periphery of said tubular portion of said socket when said stopper is mounted on said socket tubular portion, said fixing means comprising four outward protrusions formed on an outer surface of said stopper symmetrically at right and left sides thereof, and two openings formed in a peripheral wall of said stopper holder symmetrically at right and left sides thereof and extending circumferentially of said stopper holder for receiving said outward protrusions therein, two in each opening.

* * * * *